L. C. MERRELL.
FOOD OBTAINED FROM WHEY.
APPLICATION FILED JULY 27, 1908.
985,271.
Patented Feb. 28, 1911.
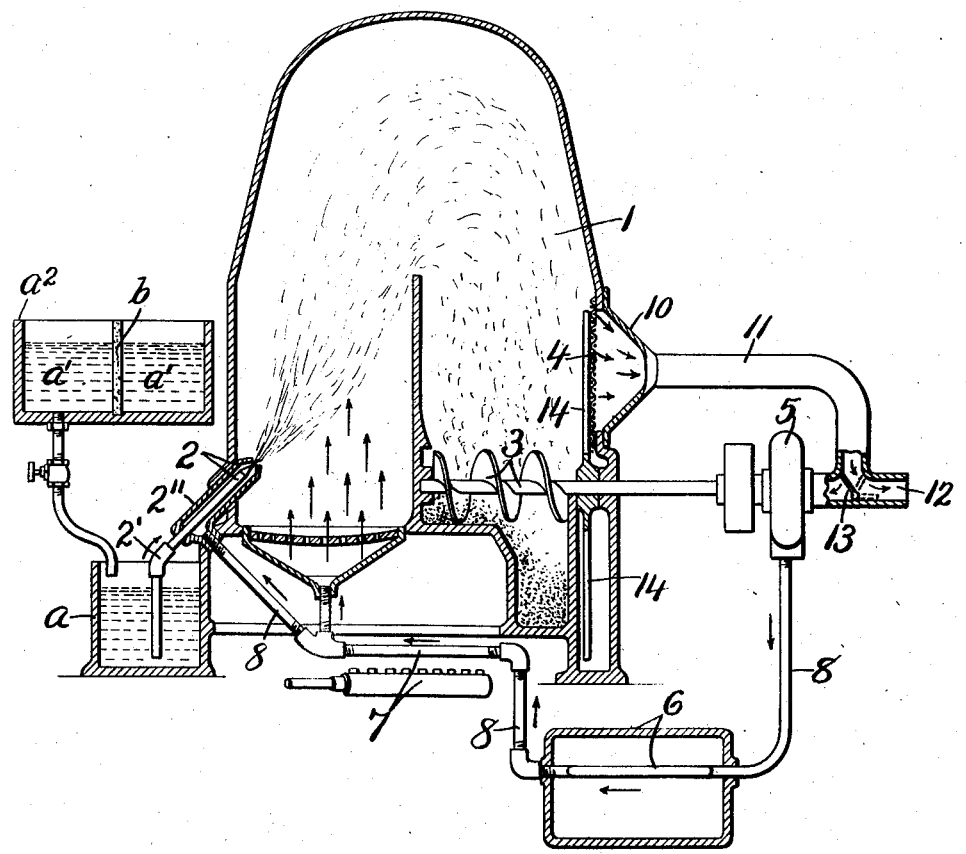

UNITED STATES PATENT OFFICE.

LEWIS C. MERRELL, OF SYRACUSE, NEW YORK, ASSIGNOR TO MERRELL-SOULE COMPANY, OF SYRACUSE, NEW YORK, A CORPORATION OF NEW YORK.

FOOD OBTAINED FROM WHEY.

985,271.  Specification of Letters Patent.  Patented Feb. 28, 1911.

Application filed July 27, 1908. Serial No. 445,505.

*To all whom it may concern:*

Be it known that I, LEWIS C. MERRELL, of Syracuse, in the county of Onondaga, in the State of New York, have invented new and useful Improvements in Food Obtained from Whey, of which the following, taken in connection with the accompanying drawings, is a full, clear, and exact description.
This invention relates to the manufacture of a commercial food from whey, in the form of a dry powder.

The analysis of whey is, of course, well known and comprises the following ingredients in about the following proportions: water 93.15, fat .35, milk sugar 4.90, proteids 1.00, ash .60, and the following I deem the best method of producing the whey from which the powder is obtained.
Whole milk is first run into a vat of convenient size and rennet added, and the resultant whey, freed from the curd. In order then to remove any particles of casein and butter fat, which may not have em-meshed with the curd, I then run the whey through a centrifugal separator so that the resultant powder will be substantially free from butter fats and casein, as it will be evident that whey designed for invalids should be free therefrom. By this process, I am able to obtain a fine sweet powder which contains approximately 75% of milk sugar, 15% of uncoagulated milk albumen and 10% of mineral salts and which powder possesses the same and all of the properties of the original whey and may be restored, at any time by the addition of a suitable amount of water, to the original liquid whey state.
By preparing the whey as above set forth, prior to desiccation, care being taken to restriction of acidity so as to preserve the sweetness of the whey, I am able to obtain a sweet whey powder, agreeable and of slightly salty flavor and which is soluble in water.

I do not wish to be understood as limiting myself to full cream milk, as it will be evident that skimmed milk may be used and that any well known method may be employed for separating the curd and fats from the whey, so long as a good pure whey is produced.

So far as I am aware, no attempt has been made heretofore, to desiccate whey without destroying the original properties and solubility of the albumen. It is essential to the product that the solubility of the lact-albumen be preserved and I believe that I am the first to produce from whey, a dry commercial food product, all of the constituent parts of which are soluble in water, and capable of restoration to the original whey condition.

Whey is considered valuable as a food by the medical profession, and is often prepared in hospitals as a nourisher for infants and invalids, but as it sours very quickly, it must be freshly prepared each time, whence arises the great advantage of being able to prepare fresh whey instantly from a dry powder.

Any suitable apparatus may be employed for separating the moisture from the solids of the liquid whey so long as the solids are recovered in the form of dry powder without in any way changing or denaturalizing the constituent properties.

For the purpose of demonstration, I have shown one form of apparatus consisting essentially of a desiccating chamber —1— into which the liquid whey together with moisture absorbing air, is introduced through a suitable spray nozzle or atomizer —2— in such a manner that the finely divided particles or globules are individually and collectively enveloped in the moisture absorbing air so that the moisture is instantaneously evaporated from the solids, leaving the latter to precipitate to the bottom of the desiccating chamber where they may be removed as by a suitable conveyer as a screw —3—. The moisture laden air is allowed to escape from the desiccating chamber through a screen —4— which is usually located above the bottom of the desiccating chamber so as to afford a more natural separation of the solids from the moisture charged air. The spray nozzle —2— has one of its pipes as —2'— dipping into a tank —a— containing the whey and the air is forced through the other pipe as 2"— by means of a pressure device as an air pump —5—, the draft of the air under pressure at the tip of the nozzle being sufficient to draw the liquid whey with it through the pipe —2'— and into the desiccating chamber. It is desirable to introduce the air into the desiccating chamber with as little moisture as possible so as to increase its moisture absorbing power, and I find that by first passing the air through a cooler as —6— and then raising its temperature so as to expand it, as by a heater —7—, in its transit from the cooler to the desiccating chamber, its moisture absorbing power is materially increased.

The cooling and heating coils are connected in series by a suitable pipe —8— between the pump —5— and desiccating chamber so that the normal temperature of the air is first lowered in passing through the cooler —6— and is then raised to a greater or less degree while passing through the heater —7—, great care being taken to keep the temperature sufficiently low to prevent any chemical change or denaturalization of the liquid or solids during the process of desiccation, but I have found by experiments and tests that air may be heated in the heater —7— to a temperature of 320° F. without making any chemical change in the whey solids and without coagulating the albumen or rendering it insoluble, provided sufficient liquid is sprayed into the air so that the temperature of the air issuing from the desiccating chamber into the conduit —11— is below 150° F., the mingling of the liquid spray with the air causing a material reduction in the temperature of the air.

In operating under this process, I have found that by increasing, within predetermined limits, the volume of air introduced into the desiccating chamber, the rapidity of desiccation was perceptibly quickened, and that by regulating both the volume and humidity of the air so as to give it a maximum moisture absorbing power, I am enabled to produce instantaneous desiccation. This instantaneity of separation of the moisture from the solids is a particularly important feature of my invention for the reason, that the rapid absorption has a cooling effect upon the solids to prevent deterioration.

In order to obtain an ample supply of moisture absorbing air sufficient to produce the desired rapidity of desiccation, I have provided a portion of the bottom of the desiccating chamber with an additional air supply conduit —9— which is connected to the main supply pipe —8— between the heater —7— and spray nozzle —2— so as to deliver additional moisture absorbing air into the desiccating chamber below the nozzle —2— and at substantially the same temperature as that which is discharged through said nozzle.

In some instances, I may prefer to establish a continuous circulation of air from the air inlet to the air outlet of the desiccation chamber and through the cooler —6— and heater —7—, and for this purpose, I have shown the screen outlet of the desiccating chamber as capped by a suitable funnel —10— which is connected by a pipe —11— to the inlet of the pump —5—, said screen outlet of the desiccating chamber and also the inlet of the pump —5— being connected to atmosphere through an opening —12— in a conduit —11—, and when such an adjunct as just described is employed, I preferably use a damper —13—, by the manipulation of which the screen outlet of the desiccating chamber and also the inlet of the pump —5— may be connected directly to atmosphere or the opening to atmosphere may be cut off by the damper so as to connect the inlet of the pump directly to the screen outlet.

What I claim:

1. A whey powder, as a new article of manufacture, containing approximately 75% of milk sugar, 15% of milk albumen, 10% of mineral salts, the powder being substantially free from fat and casein.

2. A whey powder, as a new article of manufacture, containing milk sugar, soluble lact-albumen and mineral salts in substantially the same relative proportions as they exist in fresh whey unchanged by heat in the drying process, the powder being substantially free from fat and casein.

In witness whereof I have hereunto set my hand this 25th day of July 1908.

LEWIS C. MERRELL.

Witnesses:
ALICE DONLEY,
HOWARD P. DENISON.